(12) United States Patent
Jung et al.

(10) Patent No.: US 12,162,671 B2
(45) Date of Patent: Dec. 10, 2024

(54) STORAGE DEVICE FOR COPPER FOIL ROLL

(71) Applicant: SK NEXILIS CO., LTD., Jeongeup-si (KR)

(72) Inventors: In Soo Jung, Jeongeup-si (KR); Yeon Tae Choi, Jeongeup-si (KR); Seung Min Kim, Jeongeup-si (KR); Young Gyu Yang, Jeongeup-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 23 days.

(21) Appl. No.: 18/014,266

(22) PCT Filed: Jun. 29, 2021

(86) PCT No.: PCT/KR2021/008134
§ 371 (c)(1),
(2) Date: Jan. 3, 2023

(87) PCT Pub. No.: WO2022/005147
PCT Pub. Date: Jan. 6, 2022

(65) Prior Publication Data
US 2023/0257189 A1    Aug. 17, 2023

(30) Foreign Application Priority Data
Jul. 3, 2020   (KR) .................. 10-2020-0082233

(51) Int. Cl.
*B65D 85/672*   (2006.01)
*B65D 81/107*   (2006.01)

(52) U.S. Cl.
CPC ......... *B65D 85/672* (2013.01); *B65D 81/107* (2013.01)

(58) Field of Classification Search
CPC ... B65D 81/107; B65D 85/671; B65D 85/672
(Continued)

(56) References Cited

U.S. PATENT DOCUMENTS 10,745,184 B2 *   8/2020   Bao .................. B65D 81/113
12,053,732 B2 *   8/2024   Lapelosa ............ B01D 46/0002
2019/0062029 A1   2/2019   Bao

FOREIGN PATENT DOCUMENTS

CN   102556524 A   7/2012
CN   210192286 U   3/2020
(Continued)

OTHER PUBLICATIONS

Film Coil Cover (Year: 2020).*
(Continued)

*Primary Examiner* — Bryon P Gehman
(74) *Attorney, Agent, or Firm* — K&L Gates LLP

(57) ABSTRACT

The present disclosure relates to an apparatus for accommodating copper foil. The apparatus includes an accommodation body having an accommodation space which accommodates copper foil wound on a core, a support portion coupled to the accommodation body and configured to support both ends of the core, and an elastic member disposed between the support portion and the core and configured to support the core. Here, the elastic member includes a body portion, a plurality of first protrusions arranged on a top surface of the body portion and extending in a longitudinal direction of the core, and a plurality of second protrusions arranged on a bottom surface of the body portion and extending in a direction perpendicular to the extending direction of the plurality of first protrusions. Accordingly, vibrations may be buffered in a frequency band of vibrations occurring in a transportation process.

12 Claims, 11 Drawing Sheets

(58) Field of Classification Search
USPC .................. 206/389, 408, 583; 211/13.1,
211/85.1–85.31; 248/560–635
See application file for complete search history.

(56) References Cited

FOREIGN PATENT DOCUMENTS

| | | | | | |
|---|---|---|---|---|---|
| CN | 210853622 U | * | 6/2020 | ........... | B65D 85/671 |
| JP | S5536685 A | | 3/1980 | | |
| JP | 11292183 A | * | 10/1999 | ........... | B65D 85/671 |
| JP | 2006001637 A | | 1/2006 | | |
| KR | 20150105924 A | | 9/2015 | | |
| WO | 2005030611 A1 | | 4/2005 | | |
| WO | 2021096121 A1 | | 5/2021 | | |

OTHER PUBLICATIONS

Roll Packaging (Year: 1999).*
International Search Report for related International Application No. PCT/KR2021/008134; report dated Jan. 6, 2022; (5 pages).
Written Opinion for related International Application No. PCT/KR2021/008134; report dated Jan. 6, 2022; (8 pages).
Blake; "Basic Vibration Theory"; Chapter 2; Jan. 1, 2002; http://nguyen.hong.hai.free.fr/EBOOKS/ Science%20AND%20ENGINEERING/MECANIQUE/DYNA MIQUE-VIBRATION/Shock%20&%20Vibration%20Ha ndbook.pdf; (32 pages).
Extended European Search Report for related European Application No. 21833154.4; action dated Jun. 5, 2024; (10 pages).

* cited by examiner

Fig. 11

| Classification | Ratio of first thickness to first width | RMS |
|---|---|---|
| Related art (Without pad) | - | 83.45 |
| Related art (With general pad) | - | 82.12 |
| Experimental example 1 | 2.8 | 78.42 |
| Experimental example 2 | 4 | 80.10 |
| Experimental example 3 | 2 | 75.92 |
| Experimental example 4 | 2.125 | 78.03 |

STORAGE DEVICE FOR COPPER FOIL ROLL

CROSS-REFERENCE TO RELATED APPLICATIONS

The present application is a National Stage of International Application No. PCT/KR2021/008134 filed on Jun. 29, 2021, which claims the benefit of Korean Patent Application No. 10-2020-0082233, filed on Jul. 3, 2020, with the Korean Intellectual Property Office, the entire contents of each hereby incorporated by reference.

FIELD

The present disclosure relates to an apparatus for accommodating copper foil used for manufacturing a negative electrode for a secondary battery, a flexible printed circuit board, and the like.

BACKGROUND

Copper foil is used for manufacturing a variety of products such as a negative electrode for a secondary battery, a flexible printed circuit board (FPCB), and the like. Such copper foil is manufactured using an electroplating method in which an electrolyte is supplied between a positive electrode and a negative electrode and then a current flows therethrough. While copper foil is manufactured using the electroplating method, an electrolytic copper foil manufacturing apparatus is used.

Copper foil manufactured by the electrolytic copper foil manufacturing apparatus is transported to a customer while being wound on a core. For example, the copper foil wound on the core may be transported while being loaded on a transportation means such as a vehicle, a ship, a railway vehicle, an aircraft, and the like.

In the above transportation process, an apparatus for accommodating copper foil serves to accommodate the copper foil wound on the core. An apparatus for accommodating copper foil according to the related art accommodates copper foil wound on a core by supporting the core protruding from both sides of the copper foil.

Accordingly, vibrations, shaking, and the like, which occur while a transportation means moves, are transferred to the core through the apparatus for accommodating copper foil and transferred to the copper foil through the core. Since the vibrations, shaking, and the like transferred to the copper foil cause a shock to the copper foil, a defect in the copper foil may be caused during a transportation process.

SUMMARY

Therefore, the present disclosure is designed to solve the problems and is for providing an apparatus for accommodating copper foil, which is capable of reducing a defect rate of the copper foil occurring due to vibrations, shaking, and the like which occur during a transportation process.

To solve the above problems, the present disclosure may include the following configurations.

An apparatus for accommodating copper foil according to the present disclosure may include an accommodation body having an accommodation space which accommodates copper foil wound on a core, a support portion coupled to the accommodation body and configured to support both ends of the core, and an elastic member disposed between the support portion and the core and configured to support the core. Here, the elastic member includes a body portion, a plurality of first protrusions arranged on a top surface of the body portion and extending in a longitudinal direction of the core, and a plurality of second protrusions arranged on a bottom surface of the body portion and extending in a direction perpendicular to the extending direction of the plurality of first protrusions.

According to the present disclosure, the device may have the following effects.

In the present disclosure, an elastic member is disposed between a core and a support portion. The elastic member includes a body portion, a first protrusion, and a second protrusion. Accordingly, the present disclosure may optimally buffer vibrations, shaking, and the like which occur during a transportation process. That is, since it is possible to reduce the intensity of vibrations transferred to the core, a defect rate of the copper foil caused by vibrations, shaking, and the like may be reduced. Therefore, according to the present disclosure, not only the quality of copper foil which has been transported can be improved, but also stability and ease of transport work for the copper foil can be improved.

BRIEF DESCRIPTION OF THE DRAWINGS

FIG. 11 is a table in which a vibration damping root mean square (RMS) according to the experimental example of FIGS. 9 and 10.

DETAILED DESCRIPTION

Hereinafter, one embodiment of an apparatus 1 for accommodating copper foil (hereinafter, referred to as the copper foil accommodating apparatus 1) according to the present disclosure will be described in detail with reference to the attached drawings.

Figure 1:
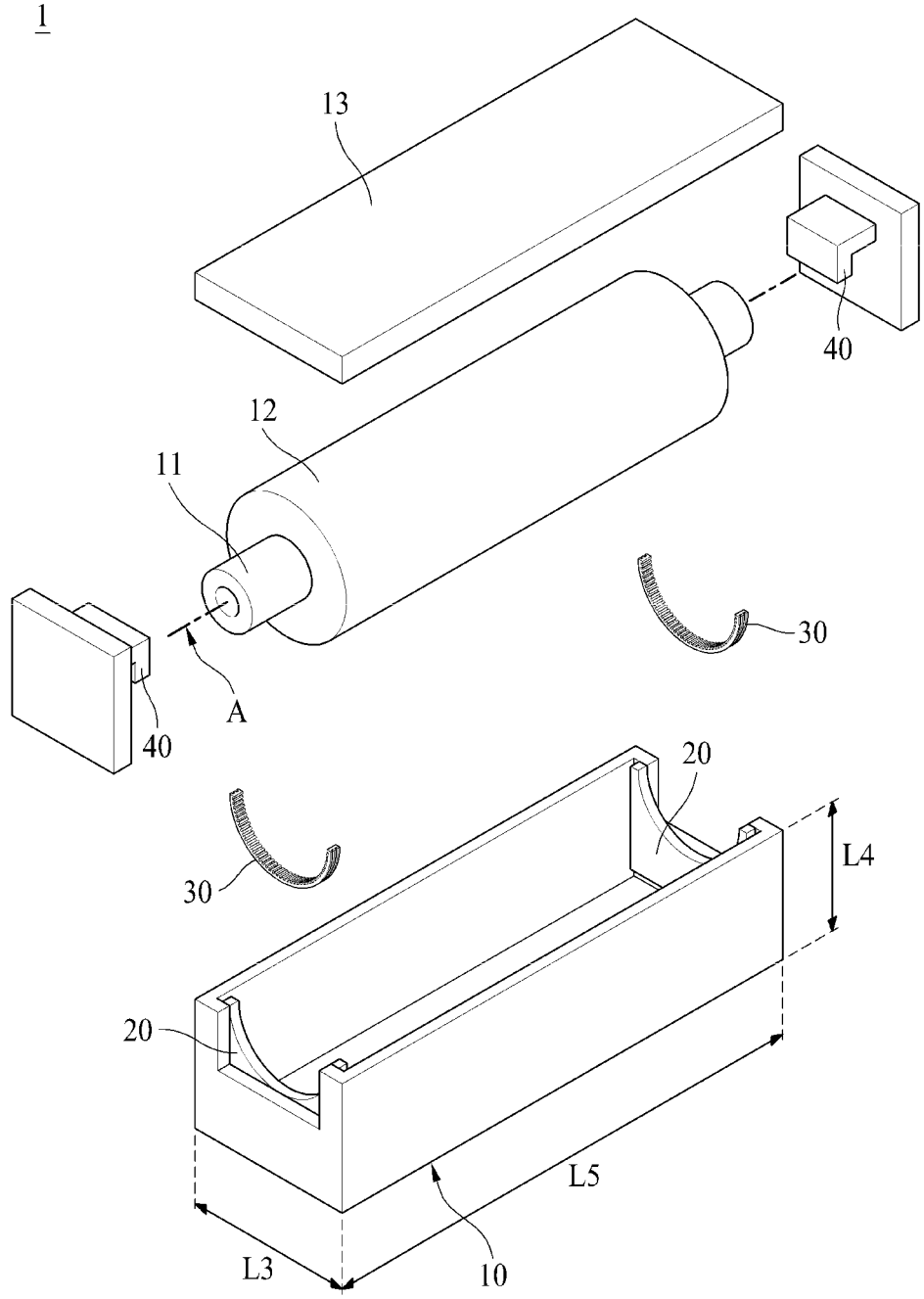
FIG. 1 is a schematic diagram illustrating an apparatus for accommodating copper foil (hereinafter, referred to as the copper foil accommodation apparatus) according to one embodiment of the present disclosure.
Figure 2:
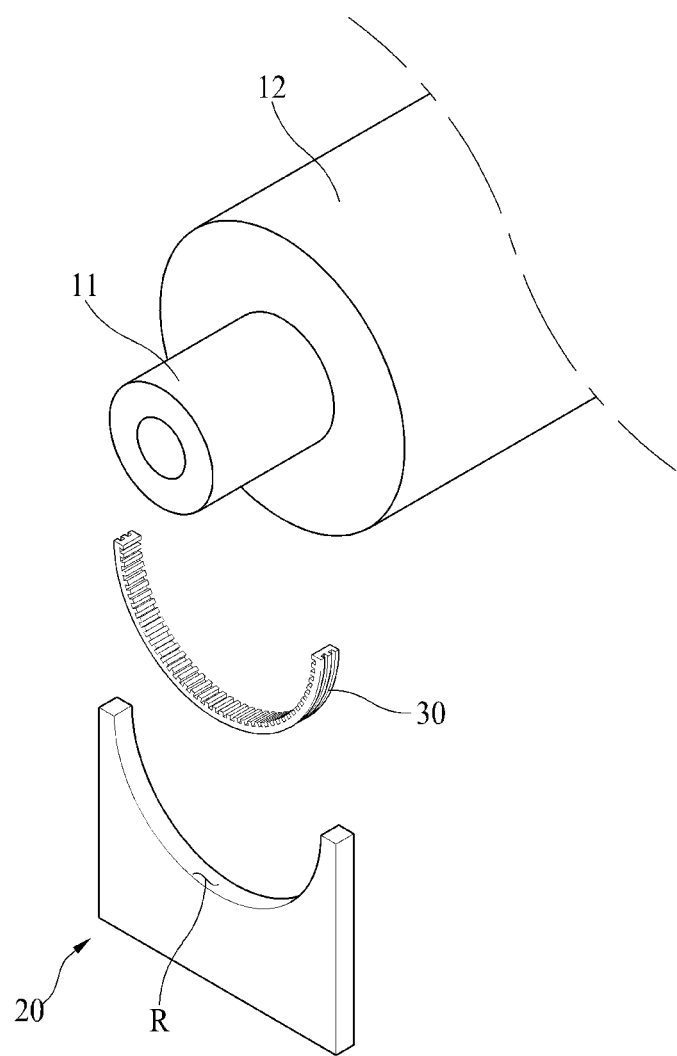
FIG. 2 is a view illustrating a core, an elastic member, and a support portion shown in FIG. 1.
Figure 3:
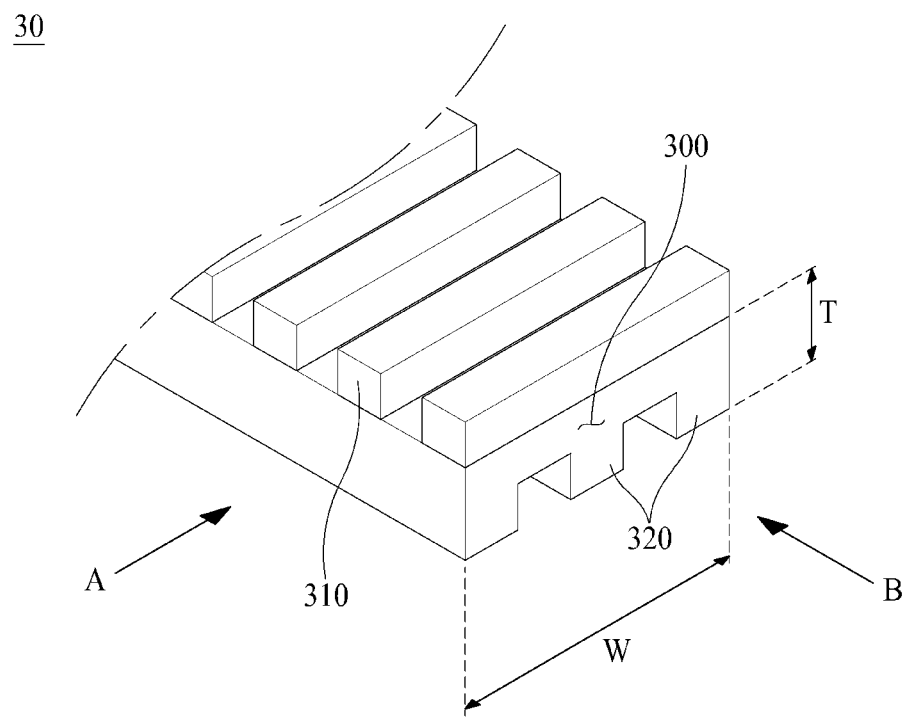
FIG. 3 is a schematic perspective view illustrating the elastic member shown in FIG. 2.
Figure 4:
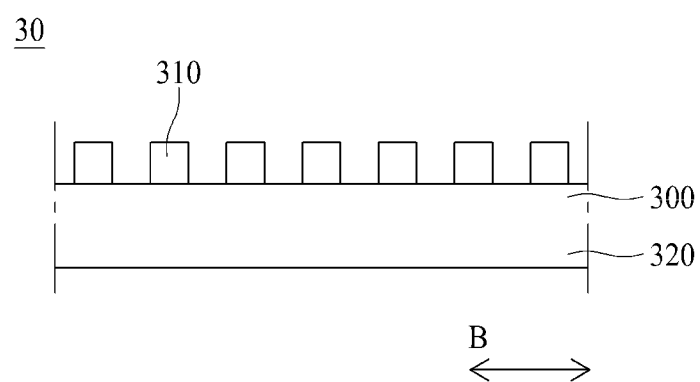
FIG. 4 is a front view of the elastic member shown in FIG. 3.
Figure 5:
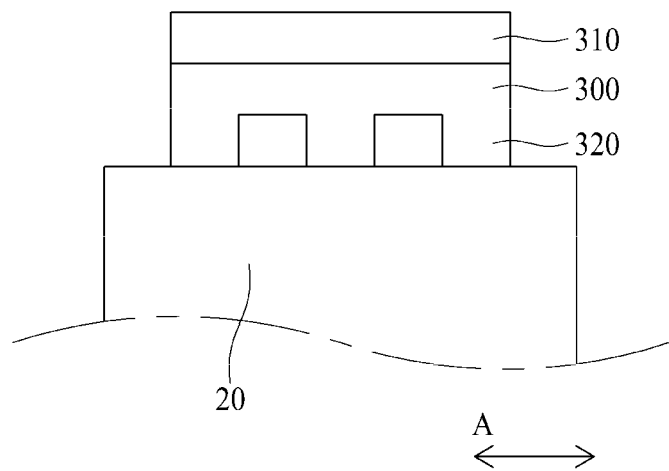
FIG. 5 is a side view of the elastic member shown in FIG. 3.
Figure 6:
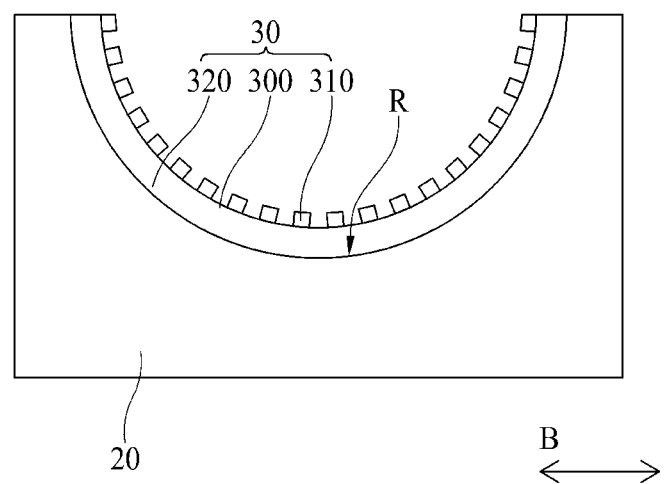
FIG. 6 is a view illustrating a state in which the elastic member and the support portion, which are shown in FIG. 3, are coupled.

FIG. 1 is a schematic diagram illustrating the copper foil accommodation apparatus 1 according to one embodiment of the present disclosure, FIG. 2 is a view illustrating a core 11, an elastic member 30, and a support portion 20 which are shown in FIG. 1, FIG. 3 is a schematic perspective view illustrating the elastic member 30 shown in FIG. 2, FIG. 4 is a front view of the elastic member 30 shown in FIG. 3, FIG. 5 is a side view of the elastic member 30 shown in FIG. 3, and FIG. 6 is a view illustrating a state in which the elastic member 30 and the support portion 20 which are shown in FIG. 3 are coupled.

Referring to FIGS. 1 to 6, the copper foil accommodation apparatus 1 according to the present disclosure accommodates copper foil 12 wound on the core 11 to prevent deformation by buffering vibrations occurring in a transportation process or the like. The copper foil 12 is used for manufacturing a negative electrode for a secondary battery, a flexible printed circuit board (FPCB), and the like.

The copper foil accommodation apparatus 1 includes an accommodation body 10, the support portion 20, and the elastic member 30. The accommodation body 10 has an accommodation space which accommodates the copper foil 12 wound on the core 11. A cover 13 may be coupled to a top of the accommodation body 10 so as to form the accommodation space. Such support portions 20 are disposed on both sides of the accommodation body 10 while being spaced apart. The support portions 20 support both ends of the core 11. The elastic member 30 is disposed between the support portion 20 and the core 11 and supports the core 11. The support portion 20 has a curve or curvature R corresponding to an outer circumferential surface of the core 11.

As one embodiment, the elastic member 30 has a certain length and includes a body portion 300, a first protrusion 310, and a second protrusion 320. The body portion 300 may have a flat panel shape. The first protrusion 310 is disposed on a top surface of the body portion 300 and extends along a direction A perpendicular to a longitudinal direction of the elastic member 30. That is, the first protrusion 310 extends along a longitudinal direction A of the core 11. The second protrusion 320 is disposed on a bottom surface of the body portion 300 and extends along a longitudinal direction B of the elastic member 30. That is, the second protrusion 320 extends in a direction B perpendicular to an extension direction A of the first protrusion 310. A plurality of such first protrusions 310 and a plurality of such second protrusions 320 are arranged.

The elastic member 30 has a first thickness T and a first width W. The first width W is based on the longitudinal direction A of the core 11 (a direction perpendicular to the longitudinal direction of the elastic member). The first thickness T is based on a direction perpendicular to both the extension direction A of the first protrusion 310 and an extension direction B of the second protrusion 320. Here, the first width W may be two to four times the first thickness T. Accordingly, vibrations are buffered in comparison to a related art without an elastic member or a related art in which a general pad is disposed. This will be described in detail.

Figure 7:
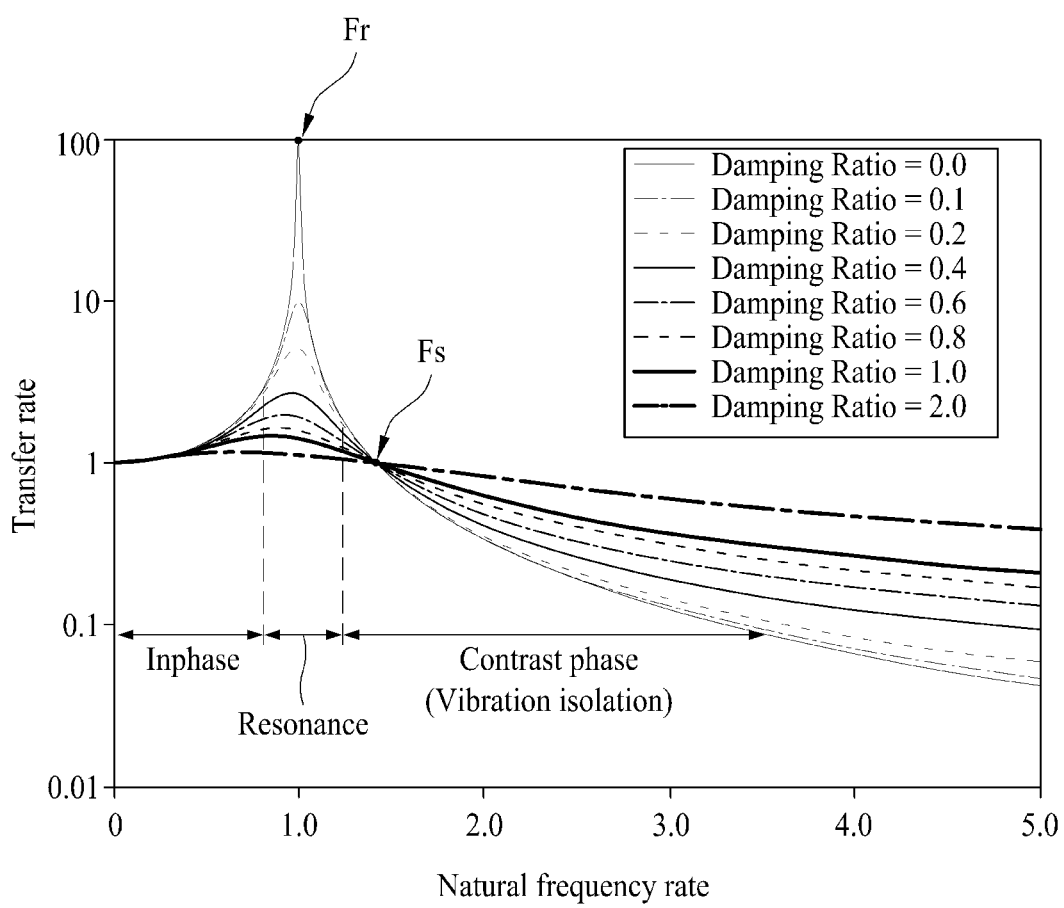
FIG. 7 is a graph illustrating a vibration damping frequency band of the copper foil accommodation apparatus shown in FIG. 1.
Figure 8:
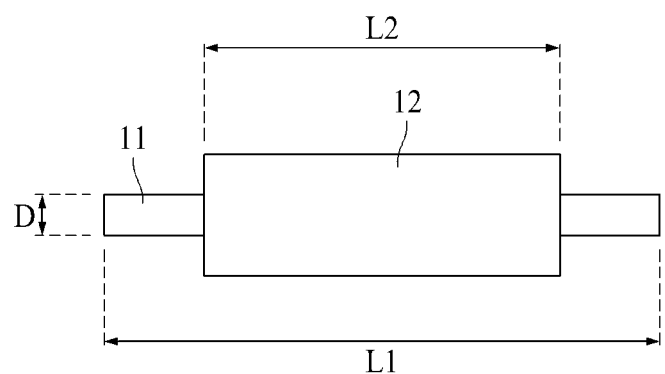
FIG. 8 is a front view illustrating the core and copper foil which are shown in FIG. 1.

FIG. 7 is a graph illustrating a vibration damping frequency band of the copper foil accommodation apparatus 1 shown in FIG. 1, and FIG. 8 is a front view illustrating the core 11 and the copper foil 12 which are shown in FIG. 1. In FIG. 7, a horizontal axis indicates a natural frequency ratio, and a vertical axis indicates a transfer rate. The natural frequency ratio is a ratio of a particular frequency to a resonant frequency, and the transfer rate is a ratio of a force transferred to an inside of the copper foil accommodation apparatus 1 to an external force applied from an outside of the copper foil accommodation apparatus 1.

Referring to FIGS. 7 and 8, the copper foil accommodation apparatus 1 according to one embodiment of the present disclosure has a resonant frequency fr calculated by the following equation.

$$fr = fs/\sqrt{(2\pi)}$$ [Equation]

Here, fr refers to a resonant frequency, and fs refers to an opening frequency of a damping frequency band.

The copper foil accommodation apparatus 1 according to the present disclosure generally receives vibrations corresponding to a frequency band of 100 Hz to 400 Hz during a transportation process thereof. Accordingly, in the case of the copper foil accommodation apparatus 1, a vibration isolation design with respect to the frequency band of 100 Hz to 400 Hz is applied. Accordingly, an opening frequency fs of the damping frequency band is 100 Hz. On the basis thereof, the resonant frequency fr of the copper foil accommodation apparatus 1 according to the present disclosure is about 70 Hz. FIG. 7 illustrates a graph of a vibration transfer rate with respect to a frequency band when a resonant frequency is 70 Hz. As shown in FIG. 7, since the resonant frequency of the copper foil accommodation apparatus 1 according to the present disclosure is 70 Hz, vibration isolation is available in the frequency band of 100 Hz to 400 Hz. Particularly, performance of vibration isolation differs according to a damping ratio. Accordingly, it is significant to secure a damping ratio which provides optimum vibration isolation performance. To this end, the copper foil accommodation apparatus 1 according to the present disclosure employs the elastic member 30.

Figure 9:
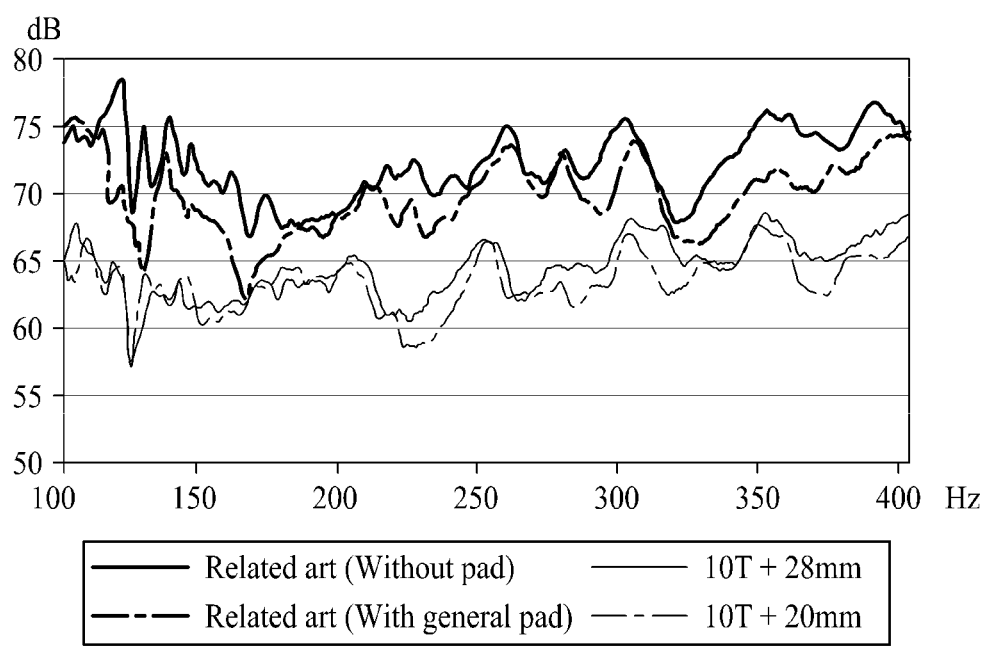
FIG. 9 is a graph illustrating a first experimental example of the copper foil accommodation apparatus shown in FIG. 1.

FIG. 9 is a graph illustrating a first experimental example of the copper foil accommodation apparatus 1 shown in FIG. 1.

Referring to FIGS. 1 and 7 to 9, when the elastic member 30 according to one embodiment of the present disclosure is applied, vibrations are dampened in a frequency band of vibrations generated during a transportation process in comparison to a related art. The related art includes an experimental example without a pad between the core 11 and the support portion 20 and an experimental example to which a general pad is applied. In the case of the present disclosure, an experimental example in which the elastic member 30 has the first thickness T of 10 T (10 mm) and the first width W of 28 mm and an experimental example in which the first thickness T is 10 T (10 mm) and the first width W is 20 mm are applied. When the elastic member 30 according to the present disclosure is applied, vibrations are damped in the frequency band according to the transportation process in comparison to related arts. A vibration transfer function (amplitude) is reduced by about 10 dB. That is, vibration energy is reduced to ¹⁄₁₀.

Here, a ratio among a length L1 of the core 11, a diameter D of the core 11, and a length L2 of the copper foil 12 wound on the core 11 is 1500:153:1358. Also, a ratio among a base line L3, a height L4, and a length L5 of the accommodation body 10 in the longitudinal direction of the core 11 is 520:630:1620. Also, a ratio between the length L1 of the core 11 and the length L5 of the accommodation body 10 is 1500:1620.

Figure 10:
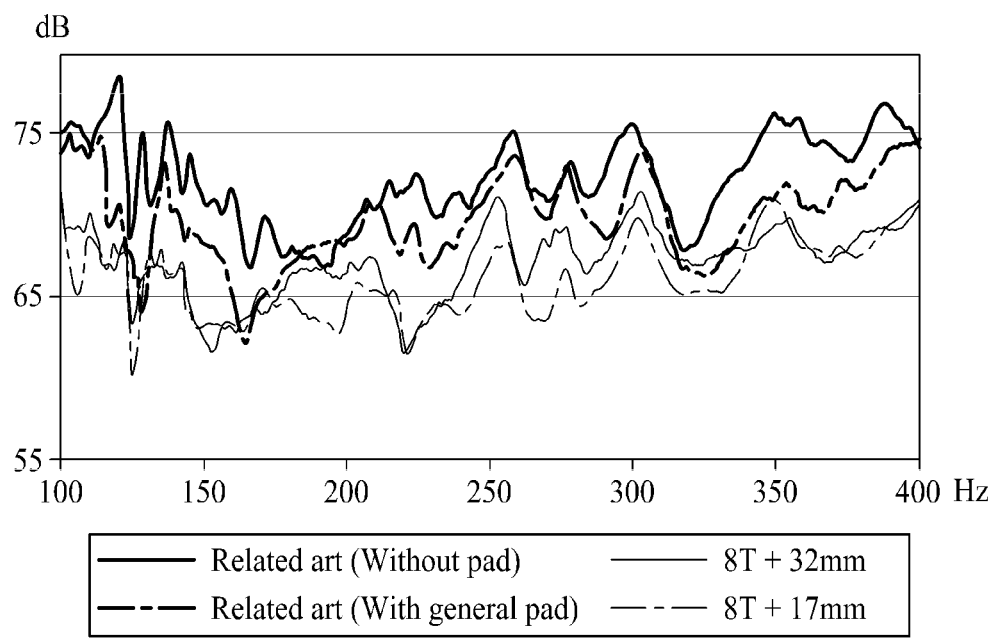
FIG. 10 is a graph illustrating a second experimental example of the copper foil accommodation apparatus is shown in FIG. 1.

FIG. 10 is a graph illustrating a second experimental example of the copper foil accommodation apparatus 1 shown in FIG. 1.

Referring to FIG. 10, the related art includes an experimental example without a pad between the core 11 and the support portion 20 and an experimental example to which a general pad is applied. The general pad has a width of 35 mm. In the case of the present disclosure, an experimental example in which the elastic member 30 has the first thickness T of 8 T (8 mm) and the first width W of 32 mm and an experimental example in which the first thickness T is 8 T (8 mm) and the first width W is 17 mm are applied. It can be seen that when the elastic member 30 according to the present disclosure is applied, vibrations are damped in the frequency band according to the transportation process in comparison to related arts.

FIG. 11 is a table in which a vibration damping root mean square (RMS) according to the experimental example of FIGS. 9 and 10. In FIG. 11, the related arts include a case without a pad and a case with a general pad being applied. Also, in an experimental example 1, the elastic member 30 having the first thickness T of 10 T and the first width W of 28 mm is applied. Also, in an experimental example 2, the elastic member 30 having the first thickness T of 8 T and the first width W of 32 mm is applied. Also, in an experimental example 3, the elastic member 30 having the first thickness T of 10 T and the first width W of 20 mm is applied. Also, in an experimental example 4, the elastic member 30 having the first thickness T of 8 T and the first width W of 17 mm is applied.

Referring to FIGS. 9 to 11, vibrations are damped in comparison to the related arts when the first thickness T of the elastic member 30 is 8 mm to 10 mm. Also, vibrations are damped in comparison to the related arts when the first width W of the elastic member 30 is 17 mm to 30 mm. Particularly, vibrations are greatly damped in comparison to the related arts when the first thickness T is 10 T (10 mm). Also, when the elastic member 30 has the same first thickness T, vibrations are more greatly damped as the first width W becomes smaller. That is, a ratio between the first width W and the first thickness T of the elastic member 30 has an influence on vibration damping.

Referring to FIG. 11, the first width W of the elastic member 30 according to the present disclosure is two to four times the first thickness T. In this case, a vibration damping effect of the elastic member 30 is great in comparison to the related arts. In FIG. 11, RMS refers to an average value dB of a vibration transfer function (amplitude).

Meanwhile, the copper foil accommodation apparatus 1 according to one embodiment of the present disclosure may further include a sponge 40. The sponge 40 is disposed above the support portion 20. The sponge 40 covers a top surface of the end of the core 11. The sponge 40 has much greater elasticity in comparison to the elastic member 30. Accordingly, the sponge 40 may not restrict the degree of freedom of a top of the core 11.

In the case of the present disclosure, vibrations applied to the copper foil 12 are buffered during a process of transporting the copper foil accommodation apparatus 1 which accommodates the copper foil 12 wound on the core 11. Accordingly, a risk of occurrence of a defect, such as wrinkles or the like, which may occur on the copper foil 12 due to vibrations may be eliminated.

While the exemplary embodiments of the present disclosure and their advantages have been described in detail with reference to the accompanying drawings, it will be apparent to those skilled in the art to which the present disclosure belongs that various changes, substitutions and alterations may be made herein without departing from the scope of the present disclosure.

The invention claimed is:

1. An apparatus for accommodating copper foil, comprising:
    an accommodation body having an accommodation space which accommodates copper foil wound on a core;
    a support portion coupled to the accommodation body and configured to support one end of the core; and
    an elastic member disposed between the support portion and the core and configured to support the core,
    wherein the elastic member comprises:
    a body portion having a certain length defining a longitudinal direction of the body portion;
    a plurality of first protrusions arranged on a top surface of the body portion and extending in a direction perpendicular to the longitudinal direction of the body portion and wherein a first member of the plurality of first protrusions is spaced apart from a second member of the plurality of first protrusions along the longitudinal direction of the body portion; and
    a plurality of second protrusions arranged on a bottom surface of the body portion and extending in the longitudinal direction of the body portion and wherein a first member of the plurality of second protrusions is spaced apart a second member of the plurality of second protrusions along the direction perpendicular to the longitudinal direction of the body portion.

2. The apparatus of claim 1, wherein the elastic member has a first width based on a longitudinal direction of the core and a first thickness based on a direction perpendicular to both an extension direction of the first protrusions and an extension direction of the second protrusions, and
    wherein the first width is two to four times the first thickness.

3. The apparatus of claim 2, wherein the first thickness is 8 millimeters (mm) to 10 mm.

4. The apparatus of claim 2, wherein the first width is 17 millimeters (mm) to 30 mm.

5. The apparatus of claim 1, comprising a resonant frequency (fr) calculated by the following equation, $$fr = fs/\sqrt{(2\pi)} \qquad \text{[Equation]}$$

wherein fr refers to a resonant frequency and fs refers to an opening frequency of a damping frequency band.

6. The apparatus of claim 5, wherein a damping frequency band of the copper foil accommodation apparatus is 100 Hertz (Hz) to 400 Hz, and
    wherein the opening frequency of the damping frequency band is 100 Hz.

7. The apparatus of claim 1, wherein a ratio among a length of the core, a diameter of the core, and a length of the copper foil wound on the core is 1500:153:1358.

8. The apparatus of claim 7, wherein a ratio between a length of the core and a length of the accommodation body is 1500:1620.

9. The apparatus of claim 1, wherein a ratio among a base line, a height, and a length of the accommodation body in a longitudinal direction of the core is 520:630:1620.

10. The apparatus of claim 1, further comprising a sponge disposed above the support portion and configured to cover the end of the core.

11. The apparatus of claim 1, wherein spaces between the plurality of second protrusions define gaps between the support portion and the elastic member that extend along the longitudinal direction of the body portion.

12. An apparatus for accommodating copper foil, comprising:
    an accommodation body having an accommodation space which accommodates copper foil wound on a core;
    a support portion coupled to the accommodation body and configured to support one end of the core; and
    an elastic member disposed between the support portion and the core and configured to support the core, wherein the elastic member comprises:
a body portion having a certain length defining a longitudinal direction of the body portion;
a plurality of first protrusions arranged on a top surface of the body portion and extending in a direction perpendicular to a longitudinal direction of the body portion;
a plurality of second protrusions arranged on a bottom surface of the body portion and extending in the longitudinal direction of the body portion; and
a sponge disposed above the support portion and configured to cover the end of the core.

* * * * *